United States Patent
Dominissini et al.

(10) Patent No.: US 6,889,999 B2
(45) Date of Patent: May 10, 2005

(54) AIRBAG TETHER RETAINER

(75) Inventors: David Dominissini, Allen Park, MI (US); Brian O. Johnson, Lapeer, MI (US)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 10/104,237

(22) Filed: Mar. 20, 2002

(65) Prior Publication Data

US 2003/0178832 A1 Sep. 25, 2003

(51) Int. Cl.$^7$ ................................................ B60R 21/16

(52) U.S. Cl. .................................. 280/730.2; 280/743.2

(58) Field of Search .......................... 280/730.2, 739, 280/743.2, 749; 24/16 PB; 248/51, 69

(56) References Cited

U.S. PATENT DOCUMENTS

| | | | |
|---|---|---|---|
| 3,114,184 A | * 12/1963 | Bigaouette ............... 24/30.5 P |
| 3,304,106 A | 2/1967 | McCormack |
| 3,494,244 A | 2/1970 | Wayland |
| 3,727,271 A | 4/1973 | Znarnirowski |
| D273,091 S | 3/1984 | Kurosaki |
| 4,477,950 A | * 10/1984 | Cisek et al. ............... 24/30.5 P |
| 4,728,238 A | 3/1988 | Chisholm et al. |
| 5,324,074 A | 6/1994 | Christian et al. |
| 5,396,684 A | * 3/1995 | Yocom ..................... 24/16 PB |
| 5,398,960 A | 3/1995 | Ravenberg et al. |
| 5,474,324 A | 12/1995 | Bentley et al. |
| 5,480,181 A | 1/1996 | Bark et al. |
| 5,601,261 A | * 2/1997 | Koike .......................... 248/71 |
| 5,647,607 A | 7/1997 | Bolieau |
| 5,672,038 A | 9/1997 | Eaton |
| 5,716,161 A | 2/1998 | Moore et al. |
| 5,745,958 A | * 5/1998 | Kaldor ....................... 24/16 R |
| 5,788,270 A | 8/1998 | HÅland et al. |
| 5,791,683 A | 8/1998 | Shibata et al. |
| 5,797,714 A | 8/1998 | Oddenino |
| 5,878,520 A | * 3/1999 | Milbrandt et al. ............ 40/665 |
| 5,884,937 A | 3/1999 | Yamada |
| 5,899,489 A | 5/1999 | Jost |
| 5,921,575 A | 7/1999 | Kretschmer et al. |
| 5,924,722 A | 7/1999 | Koide et al. |
| 5,924,831 A | 7/1999 | Ricks et al. |
| 5,931,492 A | 8/1999 | Mueller et al. |
| 5,934,729 A | 8/1999 | Baack |
| 5,947,509 A | 9/1999 | Ricks et al. |
| 5,957,487 A | 9/1999 | Stütz |
| 6,022,044 A | 2/2000 | Cherry |
| 6,062,622 A | * 5/2000 | Susman et al. ............. 294/149 |
| 6,073,961 A | 6/2000 | Bailey et al. |
| 6,079,732 A | 6/2000 | Nakajima et al. |
| 6,095,551 A | 8/2000 | O'Docherty |
| 6,129,377 A | 10/2000 | Okumura et al. |
| 6,135,490 A | * 10/2000 | Spary ...................... 280/730.2 |
| 6,135,497 A | * 10/2000 | Sutherland et al. ......... 280/749 |
| 6,145,870 A | * 11/2000 | Devane et al. ........... 280/728.2 |
| 6,149,185 A | 11/2000 | White, Jr. et al. |
| 6,152,485 A | 11/2000 | Kato |
| 6,168,186 B1 | * 1/2001 | Welch et al. ............ 280/728.2 |
| 6,176,513 B1 | 1/2001 | Neidert |
| 6,192,554 B1 | * 2/2001 | Dumcum .................. 24/16 PB |

(Continued)

Primary Examiner—Paul N. Dickson
Assistant Examiner—Laura B Rosenberg
(74) Attorney, Agent, or Firm—Sally J. Brown

(57) ABSTRACT

An airbag tether retainer is disclosed that is of minimal size to accommodate vehicle safety and styling requirements and yields to conform to contours of a vehicle pillar. The tether retainer is interchangeable with left or right vehicle pillars thus reducing fabrication costs. The tether retainer imposes minimal stress on a worker attaching the retainer. In certain embodiments, the tether retainer includes a body and one or more tabs and corresponding tab locks which extend from the body. An airbag tether is positioned on the body and each tab is looped around the tether and secured to the body by a corresponding tab lock. The body may then be secured to a vehicle pillar.

28 Claims, 4 Drawing Sheets

U.S. PATENT DOCUMENTS

| | | | |
|---|---|---|---|
| 6,209,907 B1 * | 4/2001 | Fischer .................... | 280/728.3 |
| 6,217,061 B1 * | 4/2001 | Harland et al. .......... | 280/730.2 |
| 6,224,091 B1 | 5/2001 | Eyrainer et al. | |
| 6,237,938 B1 | 5/2001 | Boxey | |
| 6,237,939 B1 | 5/2001 | Resh | |
| 6,237,943 B1 | 5/2001 | Brown et al. | |
| 6,260,878 B1 | 7/2001 | Tanase | |
| 6,290,253 B1 | 9/2001 | Tietze et al. | |
| 6,328,333 B1 | 12/2001 | Patel et al. | |
| 6,361,068 B1 | 3/2002 | Stein et al. | |
| 6,375,214 B1 | 4/2002 | Nishikaji | |
| 6,378,897 B1 | 4/2002 | Butters et al. | |
| 6,412,810 B1 | 7/2002 | Wipasuramonton et al. | |
| 6,431,585 B1 * | 8/2002 | Rickabus et al. ........ | 280/728.3 |
| 6,454,296 B1 * | 9/2002 | Tesch et al. ............. | 280/730.2 |
| 6,658,703 B1 * | 12/2003 | Teagno et al. ........... | 24/16 PB |
| 2001/0035639 A1 * | 11/2001 | Amamori ................... | 280/740 |
| 2002/0125705 A1 | 9/2002 | Wong et al. | |

\* cited by examiner

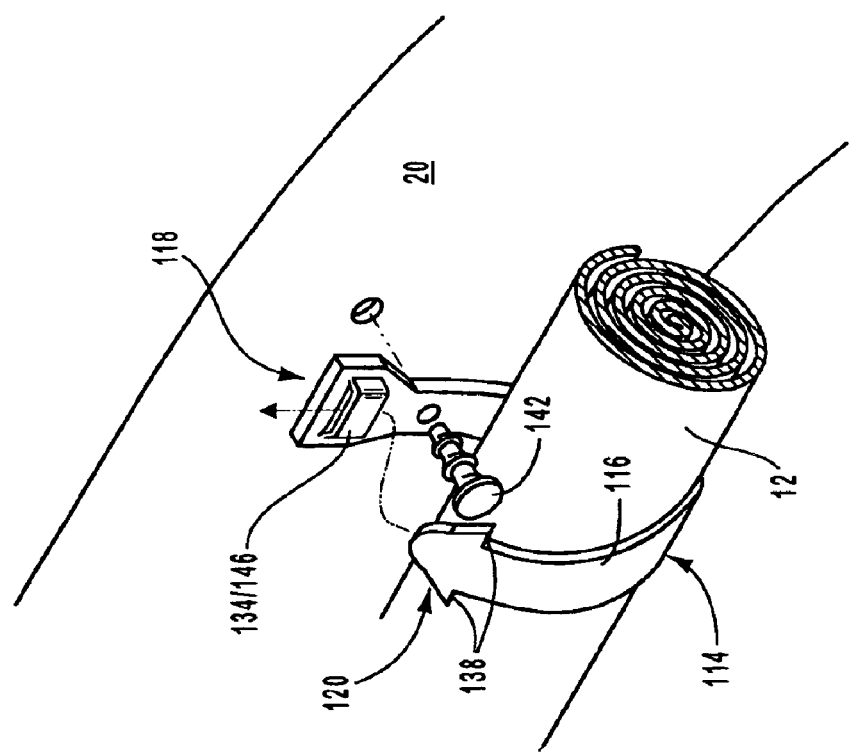
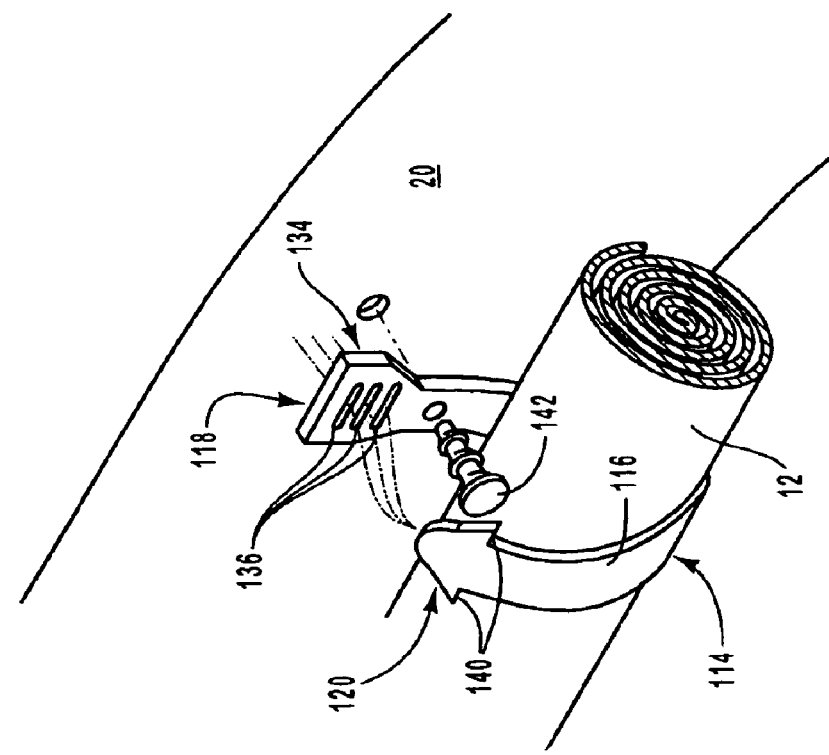

AIRBAG TETHER RETAINER

BACKGROUND OF THE INVENTION

1. The Field of the Invention

The present invention relates to airbag protection systems in motor vehicles. More specifically, the invention relates to a retainer for a tether of a curtain airbag.

2. Technical Background

Inflatable airbags are well accepted for use in motor vehicles and have been credited with preventing numerous deaths and injuries. In fact, the inclusion of inflatable safety restraint devices, or airbags, is now a legal requirement for many new vehicles. Airbags are typically installed in the steering wheel and in the dashboard of a vehicle. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield. Side impact airbags, known as curtain airbags, have also been developed in response to the need for protection from impacts in a lateral direction, or against the side of the vehicle.

Recently, airbag technology has advanced such that curtain airbags are now enlisted to provide roll-over protection as well as side impact protection. During a roll-over accident, occupants can be jostled around considerably. Consequently, the occupant may be ejected from the vehicle. Alternatively, a head or limb of an occupant may extend outside the vehicle during the roll-over. "Occupant excursion" during roll-overs is a common cause of automotive fatality, particularly in the case of vehicle occupants that are not wearing a seat belt during the roll-over.

Conventional curtain airbags, generally unfold or unroll downward to inflate beside a person to prevent the person from hitting the door or window during lateral impact. Since a vehicle occupant may be leaning forward, reclined in the seat, or at any position between, such airbags are often long enough to cover the whole interior side of a vehicle, protecting occupants in both the front and rear passenger compartments.

To provide side impact and roll-over protection, curtain airbags are sized to hold large volumes of inflation gas and descend below the window sill. In addition, the curtain airbag typically includes a tether connected to the bottom corner at each end. The tether is anchored to the bottom corner of the front and back roof pillars of the vehicle. The tether provides tension and support of the curtain airbag to prevent occupant excursion. However, due to the contour of the roof and pillars, often, the side of the vehicle is a trapezoid shape and the curtain airbag is generally rectangular shaped. This leaves a triangular area exposed in the lower corners. Typically, the tether is a single strap which does not close the triangular area. During a roll-over accident, an occupant's limb may extend through the unprotected triangular area resulting in serious injury.

To protect against limb excursion, the conventional strap tether may be replaced by a sail tether. Generally, the sail tether is a single layer of material similar to that used for the airbag curtain. The sail tether is shaped to fit the triangular area. The sail tether may be sewn or similarly attached to the vertical edge of the airbag curtain. The sail tether is rolled or folded with the airbag curtain during assembly. Thus, rather than a substantially two-dimensional airbag tether, a three dimensional sail tether roll is to be stored and concealed until the curtain airbag activates.

Typically, a single strap or rolled sail tether is stored and retained lengthwise within the A-pillar and the C or D-pillar of a vehicle. The area within the pillar for storing and retaining the tether is referred to herein as a "package". The package is an area between the frame of the pillar and the ornamental trim secured to the frame. The tether is stored until the curtain airbag is activated. The inflating curtain airbag pulls the tether out from the package and down toward the window sill.

The tether is retained to ensure that the tether stays in an operable position during the expected life of the vehicle, particularly if pillar trim needs to be removed for a repair after sale of the vehicle. In addition, retaining the tether reduces a vehicle manufacture's liability from loose items projecting around the passenger compartment during an accident.

Conventionally, the tether is retained within the package by an extrusion which runs the length of the pillar. The extrusion serves as a housing for the tether. The extrusion is made by extruding material such as hard plastic through a die.

Generally, the extrusion includes an opening extending along the length for receiving the tether. A press-lock fastener is pressed into the opening to engage walls of the extrusion to close the opening. The press-lock fastener may be attached or attachable to the trim. The extrusion is secured to the frame of the pillar when the inflatable curtain airbag module is installed in a vehicle. Conventional tether retainers such as extrusions have been hindered by a number of problems.

One problem is that conventional tether retainers, particularly those used with sail tethers, have prevented a vehicle manufacturer from complying with U.S. federal regulations. These regulations prevent a manufacturer from selling the vehicle in the U.S., or may require a recall, if failure to meet the regulations is discovered after a vehicle sale.

Generally, vehicle manufacturers favor both styling and aesthetic appeal of a vehicle design and compliance with safety requirements imposed by the government. However, where these two interests collide, solutions should be found which most favorably fulfill both interests.

Recent safety requirements contained in the Federal Motor Vehicle Safety Standards (FMVSS), particularly standard 201, set out performance requirements for providing head impact protection for occupants. As part of the requirements, a manufacturer should provide protection in the A-pillar for an occupant during a low speed accident. Generally, these are accidents in which the curtain airbag may not be deployed but the occupant may suffer significant injury. Specifically, the A-pillar should be designed to absorb a certain amount of energy from the impact. Typically, this is done by installing foam, or other yielding energy absorbing material (referred to herein as countermeasures) into the trim which covers the A-pillar.

Styling designs for the vehicles include the maximum shape and size of the A-pillars as well as the shape, size, texture, and color of the trim attached to the pillars. The minimum shape and size is generally dictated by the structural requirements for the A-pillars. In addition, styling designs aid in marketing the vehicle.

The manufacturer prefers to comply with both styling and safety requirements. These requirements generally dictate the size of the package for the curtain airbag tether and retainer. Use of three dimensional sail tether rolls including conventional extrusion tether retainers requires a larger package. If the package is larger, less countermeasure may be used which may cause the vehicle to fail the safety standard. If the additional countermeasure material is included, the trim shape may need to be changed which modifies the styling.

Furthermore, conventional styling requirements may require an A-pillar having a curved contour. Conventional extrusion tether retainers are rigid and straight. Therefore, the conventional extrusion is inoperable with contoured A-pillars.

In addition, because space in the A-pillar is minimal, generally a first extrusion is designed specifically to fit a right A-pillar and another for the left A-pillar. The specific design for right and left A-pillars is due to the curve of the pillar and position of trim fasteners, fastener bolt holes, and other A-pillar features. Furthermore, the left and right extrusions typically may only be installed in one way. While the extrusion are capable of being installed on the wrong sides, doing so may cause the curtain airbag to fail to deploy properly.

Using two slightly different extrusions increases tooling costs for the parts. The two similar extrusions may also be easily confused by a worker installing them. Improper installation may require an expensive recall or additional inspection processes.

Another problem is the impact on workers securing the tether within the extrusion. Typically, joining the press-lock fastener to the opening is slow and labor intensive. The small size of the extrusion and tight fit of the press-lock fastener require workers to pinch and press with their hands and fingers. Repeatedly joining high numbers of press-lock fasteners and extrusions may lead to repetitive stress injuries including carpal tunnel syndrome.

Accordingly, it would be an advancement in the art to provide an airbag tether retainer which fits within a smaller package size such that vehicle safety and styling requirements for vehicle pillars may be readily accommodated. It would be a further advancement to provide an airbag tether retainer that is flexible to conform to curves and other features of vehicle pillars including A-pillars. It would be another advancement in the art to provide an airbag tether retainer that is less expensive to fabricate than conventional airbag tether retainers. Additionally, it would be an advancement to provide an airbag tether retainer of a single design that may be installed on either the right or left side pillars of a vehicle. It would be another advancement in the art to provide an airbag tether retainer which places less repetitive stress and strain on a worker securing the airbag tether retainer to an airbag tether. The present invention provides these advancements in a novel and useful way.

BRIEF SUMMARY OF THE INVENTION

The apparatus of the present invention has been developed in response to the present state of the art, and in particular, in response to the problems and needs in the art that have not yet been fully solved by currently available airbag tether retainers. Thus, the present invention provides an airbag tether retainer which is inexpensive to produce, may be used on either side of a vehicle, conforms to various pillar contours, is less physically demanding on assembly workers, and occupies less space than conventional airbag tether retainers.

In one embodiment, the airbag tether retainer includes a planar body having one or more tabs extending from a side of the body. The body may also include one or more mounting holes to secure the body to a vehicle roof pillar. Preferably, the body readily conforms to the contour of the vehicle roof pillar.

Tab locks connected to the body are configured to engage tabs to secure an airbag tether between the tabs and the body. Preferably, each tab includes a catch disposed along its length. The tab lock engages the catch to retain the tab.

In certain embodiments, the tab lock releasably engages the tab. For example, the tab lock may comprise tape. Alternatively, the tab lock and catch may be corresponding members of a VELCRO®, or like fastening system. The tab lock may release a tab when an airbag connected to the tether is activated.

In other embodiments, the tab lock retains the tab, preferably via a catch, during activation of the airbag. The tabs may include a release member configured to sever the tab when the airbag tether transmits tension to the tabs engaging the tab locks. Preferably, the release members are perforations which are strategically positioned on each tab between a tab lock and a corresponding catch.

In a preferred embodiment, the body is substantially rectangular. Two or more tabs may extend perpendicular to one side of the body. Perpendicular corresponding tab locks are disposed along an opposite side. The body, tabs, and tab locks are preferably formed from a single piece of flexible material.

Preferably, the tabs include a catch which engages the tab lock. In one embodiment, the tab lock comprises a slot. Alternatively, the tab lock may comprise a loop extending perpendicular to the tab lock. The catch may comprise a pair of barbs which extend in opposite directions from the tab. The barbs may be shaped to pass readily through the slot in one direction and oppose passage through the slot in an opposite direction. Alternatively, the catch may comprise at least one detent which is sized and shaped to engage a slot in a manner similar to the pair of barbs.

In an alternative embodiment, the airbag tether retainer comprises a single strap having a head and a tail. The head and tail are capable of being secured to each other to encircle and retain an airbag tether. For example, the head and tail may be tied together in a knot. Preferably, the head and tail are substantially the same size and shape. The strap may include a mounting member for securing the strap to a vehicle roof pillar. A plurality of straps may be used to retain and secure an airbag tether to a vehicle roof pillar.

Preferably, the strap includes a fastener disposed in the head and a catch disposed in the tail. The fastener may comprise a slot or loop and the catch may comprise a pair of barbs, or detents as described above. In addition, the strap may include a release member which severs the strap to release the tether when the airbag is activated.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and may be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which:

FIG. 4A is an enlarged perspective view illustrating an alternative embodiment comprising a single strap.

FIG. 4B is an enlarged perspective side view illustrating an alternative embodiment for a tab lock or fastener in various embodiments of the present invention.

DETAILED DESCRIPTION OF THE PREFERRED EMBODIMENTS

The present invention can be better understood with reference to the drawings where like parts are designated with like numerals throughout.

Figure 1:
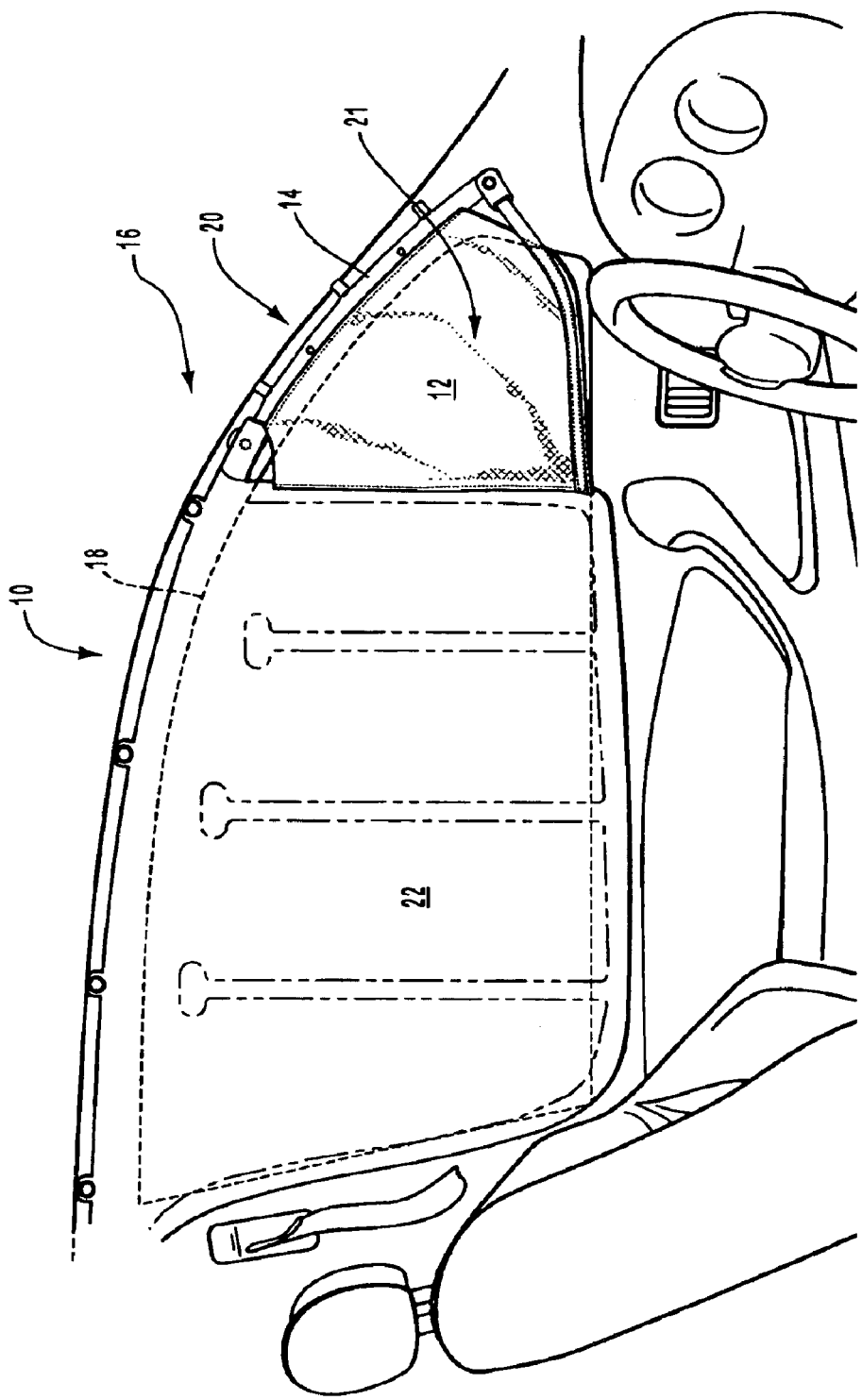
FIG. 1 is a perspective side view illustrating a curtain airbag including a deployed sail tether and one embodiment of the present invention for retaining the sail tether until the curtain airbag is activated.

FIG. 1 is a perspective side view illustrating a deployed curtain airbag system 10 having a sail tether 12 and including one embodiment of an airbag tether retainer 14. FIG. 1 illustrates an interior side 16 of a conventional vehicle, including large windows 18. The vehicle may be a van, sport utility vehicle, or other vehicle with large windows and relatively thin sloped A-pillars 20.

The size of the windows 18 and contour of the A-pillar 20 may result in a relatively large triangular opening 21 between the curtain airbag 22 and the A-pillar 20. To prevent excursion of occupant's limbs as discussed above, the sail tether 12 attached to the curtain airbag 22 unrolls and substantially covers the triangular area 21. Different embodiments of the present invention will be described primarily in relation to sail tethers 12. However, it is readily understood that these embodiments may be used with conventional strap tethers as well.

FIG. 1 illustrates the limited space within the A-pillar 20, the package, where the sail tether 12 is to be retained by the tether retainer 14. As mentioned above, the package size is determined by space required for countermeasures, attachment features which secure the trim cover (not shown), and the contour of the A-pillar 20. The contour and design of the trim cover are generally determined by styling requirements.

The tether retainer 14 releases the sail tether 12 when the curtain airbag 22 inflates. Preferably, the tether retainer 14 is mounted to the A-pillar 20 to ensure the sail tether 12 will be released properly and to prevent the retainer 14 from injuring an occupant. Retainers 14 according to the present invention may be installed at the various locations for airbag tethers 12 including a rear pillar (C, D, or the like) and/or an intermediate pillar (B or C).

Figure 2:
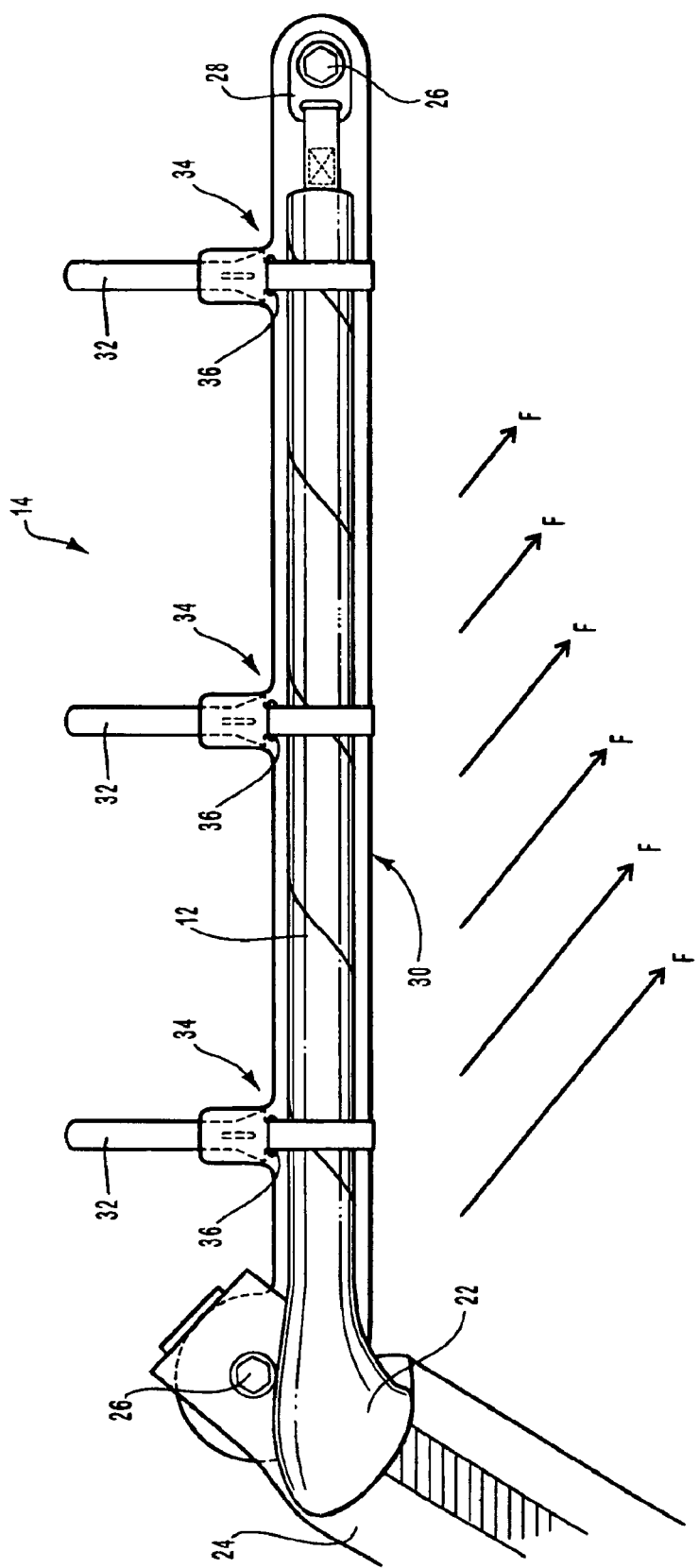
FIG. 2 is an enlarged perspective view illustrating one embodiment of the present invention assembled and attached to a pillar to retain a sail tether roll of a curtain airbag.

Referring now to FIG. 2, an installed and assembled embodiment of the retainer 14 is illustrated. Generally, the sail tether 12 is rolled or folded with the curtain airbag 22. The curtain airbag 22 may be retained within a sleeve 24. The sleeve 24 and curtain airbag 22 are preferably secured to a roof rail (not shown) by a mounting bolt 26. The sail tether 12 is connected to a tether bracket 28 which is secured to the lower corner of an A-pillar by a mounting bolt 26.

In the depicted embodiment, the airbag tether retainer 14 includes a body 30, one or more tabs 32, and tab locks 34. The body 30 provides the structural support for the retainer 14. The airbag tether retainer 14 is preferably mounted to the A-pillar using the same mounting bolts 26 used for the sail tether 12 and curtain airbag 22. As illustrated, the tabs 32 loop over the sail tether 12 and engage the tab locks 34.

Preferably, the body 30 is planar having a very small thickness compared to its length and width. For example, the body 30 may be between about 0.01 inches and 0.03 inches thick while the width is about 0.75 inches and the length is between about 24 and 36 inches, or more. The body shape is generally determined by the shape of the A-pillar 20 and position of mounting bolts 26 and fastening features used to secure the trim to the A-pillar 20. Preferably, the body 30 has a long rectangular shape made from a flexible material. The flexibility of the body 30 allows the body 30 to readily conform to the contour of the A-pillar 20 and/or yield to accommodate other features such as trim fasteners within the A-pillar 20.

In the depicted embodiment, the tab locks 34 engage and retain the tabs 32 by threading the tabs 32 through slots 36. However, various kinds of tab locks 34 may be used. For example, the tab lock 34 may comprise a section of tape. Alternatively, the tabs 32 and tab locks 34 may each include a corresponding member of a VELCRO® or other fastening system.

Furthermore, the tabs 32 and tab locks 34 may be designed to release the tabs 32 when the curtain airbag 22 inflates and pulls the tabs 32 away from the tab locks 34. Alternatively, the tab locks 34 may be configured to secure the tabs 32 against tension forces created by inflating the curtain airbag 22.

Referring still to FIG. 2, arrows F illustrate the direction and magnitude of tension forces which act on the rolled and retained sail tether 12 when the curtain airbag 22 inflates. The long arrows F represent high forces pushing downward on the sail tether 12. The tension forces decrease as one moves toward the lower corner of the A-pillar 20. Therefore, the arrows F are progressively shorter as one moves towards the tether bracket 28 anchoring the sail tether 12. These tension force may release the tab locks 34 or, alternatively, sever the tabs 32.

Figure 3:
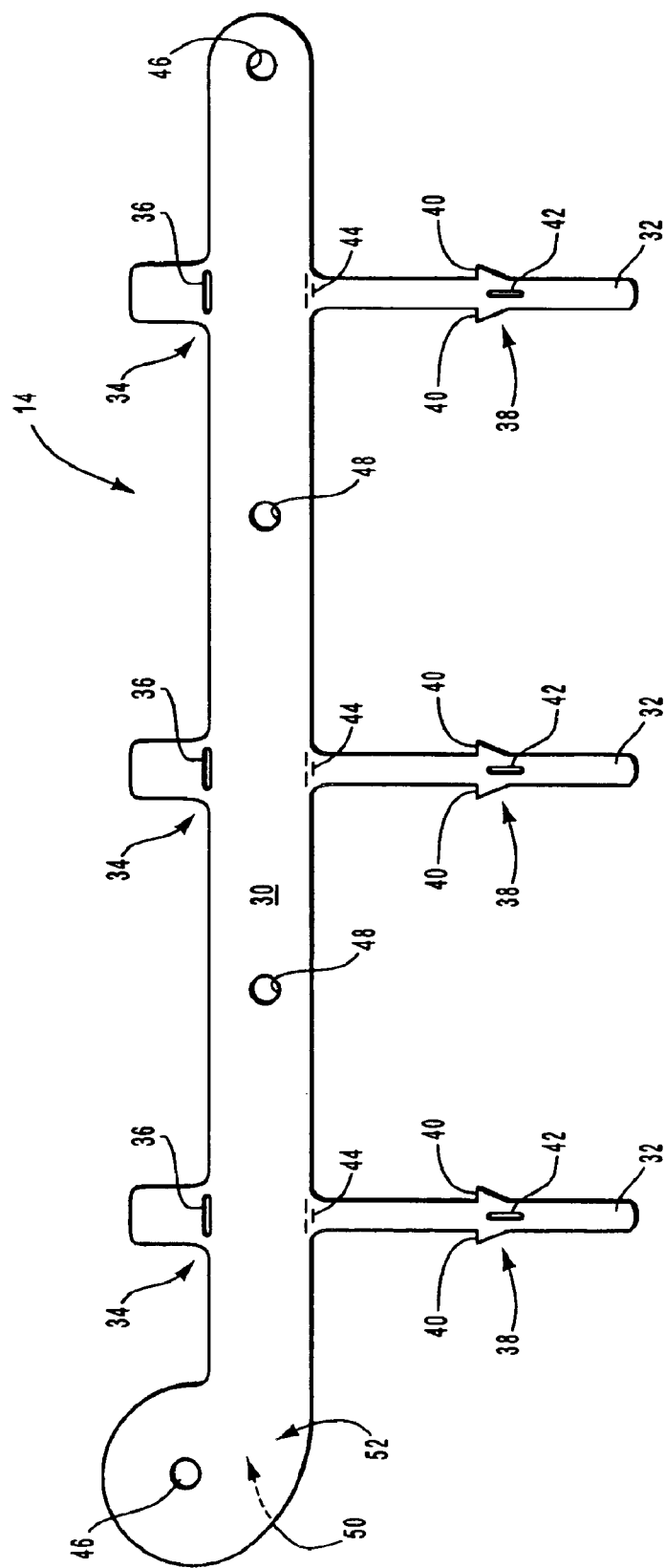
FIG. 3 is a perspective view of one embodiment of the present invention prior to assembly and attachment within a vehicle.

Referring now to FIG. 3, a perspective view of one embodiment of a tether retainer 14 prior to assembly and installation is illustrated. Preferably, all the tabs 32 extend perpendicularly from a common side of the body 30. Similarly, corresponding tab locks 34 extend perpendicular from the opposite side of the body 30. The tab locks 34 may be positioned opposite a tab 32. Positioning the tabs 32 and tab locks 34 on a common side facilitates assembly for a worker assembling the tether retainer 14. The commonality allows the worker to establish a rhythm and pattern for assembly.

Conventionally, when a tether retainer 14 is installed in the package of the A-pillar 20, the retainer 14 should be positioned above or below the trim fasteners and trim fastener mounts (commonly referred to 'dog houses') which line the trim. Generally, the retainer 14 may be incorrectly positioned on one side of the trim fasteners or the other. This may result in the sail tether 12 failing to deploy which interferes with deployment of the curtain airbag 22.

In certain embodiments, the tabs 32 extend toward the interior of the vehicle before the retainer 14 is installed. The tabs 32 may be sized such that once the tabs 32 are engaged by the tab locks 34, if the retainer 14 is installed on the wrong side of trim fasteners, the ends of the tabs 32 encroach on the windshield channels to indicate improper retainer 14 installation. When the indicating tabs 32 are noticed, the problem may be easily resolved.

In the depicted embodiment, the tab locks 34 include a slot 36 sized to receive a tab 32 and engage a catch 38 disposed along the tab 32. The slot 36 is disposed within a tab lock 34 which may extend from the body 30 to provide a readily identifiable 'grab' tab for a worker. Alternatively, the slot 36 may be positioned in the body 30.

The catch 38 provides a simple mechanism for securing the tab 32 within the slot 36. In certain embodiments, the catch 38 includes a pair of barbs 40 which extend in opposite directions from the sides of each tab 32. Preferably, the barbs 40 are positioned opposite each other. The barbs 40 are shaped to allow the tab 32 and barbs 40 to readily pass through the slot 36 in one direction and oppose passage of the tab 32 through the slot 36 in the opposite direction.

For example, the barbs 40 may be triangle shaped having a slope toward the free end of the tab 32 which is inserted into the slot 36. A base of the triangle shaped barb 40 may then oppose removal of the tab 32 from the slot 36. In certain embodiments, the tab 32 may include a longitudinal slot 42 positioned between the barbs 40. The longitudinal slot 42 allows the barbs 40 to be more readily pressed together to facilitate passage of the barbs 40 through the slot 36.

While barbs 40 and slots 36 are illustrated, other variations of a catch 38 and a tab lock 34 are contemplated within the scope of the present invention. For example, the tab 32 may include one or more detents (not shown) along the sides of the tabs 32. The detents may be shaped and sized to engage the slot 36 of the tab lock 34. Alternatively, an end of the tab 32 may be shaped like a hook which engages the slot 36.

Furthermore, the tab lock 34 may comprise a loop which extends out from the tab lock 34 in a direction transverse to a plane defined by the tab lock 34. In addition, the tab lock 34 may comprise a buckle and the tab 32 may include holes which are engaged in a pin of the buckle. Thus, while a preferred embodiment is illustrated in FIG. 3, numerous alternatives are within the scope of the present invention.

In a preferred embodiment, the tab locks 34 retain the tabs 32 even when tension forces from the inflating curtain airbag 22 attempt to disengage the tabs 32. Alternatively, the tab locks 34 may release the tab 32 when the tension forces are applied. If the tab locks 34 retain the tabs 32 during inflation, the tabs 32 may include a release member 44 which severs the tab 32 when the curtain airbag 22 is activated. The release member 44 may be a structure positioned strategically between the catch 38 and the tab lock 34 to take full advantage of the tension forces acting on the tabs 32. For example, the release member 44 may comprise one or more perforations which are near where the tabs 32 connect to the body 30. Therefore, in the depicted embodiment, when the curtain airbag 22 is activated, the tabs 32 are severed to allow the sail tether 12 to deploy. The tabs 32 remain secured to the tether retainer 14 to prevent the tabs 32 from projecting about the occupant compartment.

Referring still to FIG. 3, a clear view of the body 30 of the retainer 14 is provided. The body 30, discussed above, serves to retain the tabs 32 when the curtain airbag 22 is activated and position the tabs 32 when the retainer 14 is assembled. In certain embodiments (discussed below with reference to FIG. 4A), straps including a catch 38 and a tab lock 34 may be used to retain the sail tether 12. However, these embodiments require a worker to position one or more straps along the length of the sail tether 12. This delays the assembly process.

With a single body 30 a plurality of straps, or tabs 32 are positioned with a single motion. In addition, the body 30 may include mounting holes 46 which serve as guides for a worker in positioning the body 30. The mounting holes 46 may be positioned and sized to receive the mounting bolts 26. The mounting bolts 26 are securable within corresponding mounting holes (not shown) in the A-pillar 20. Thus, the mounting bolts 26 may secure the airbag curtain 22, sail tether 12 and the tether retainer 14 to the A-pillar 20. Furthermore, the body 30 may include one or more rivet holes 48 sized to receive a fastening rivet such as christmas tree rivet. The christmas tree rivets may be used to further secure the retainer 14 and/or a trim panel.

Preferably, the body 30 is made from a durable and flexible material such as high density polyethylene (HDPE). Alternatively, the material may be paper, polypropylene, aluminum, or like materials of an operable thickness which is durable and flexible to allow the body 30 to readily conform to the contour of the A-pillar 20. The body 30 material should maintain its integrity in extreme temperatures and over a period of about fifteen to twenty years.

Referring still to FIG. 3, conventionally, extrusions used to retain airbag tethers are manufactured on extrusion machines employing up to three very expensive dies. The present invention, including the body 30, tabs 32, tab locks 34, and additional features discussed above, may be formed from a single piece of parent material. In addition, in contrast to extrusions, certain embodiments of the present invention may be manufactured using a single die in a die cutting press. Thus, use of the present invention provides significant cost savings.

Furthermore, the cost of conventional extrusion retainers is often substantially increased because a different extrusion is made for corresponding pillars on the left and right hand sides of a vehicle. The ribs, holes and other features of the extrusion may dictate that only one surface of the extrusion may be mounted to the vehicle pillar. However, as illustrated, a tether retainer 14 according to the present invention may be attached to a vehicle pillar by either surface of the retainer 14. For example, in the depicted embodiment, the back surface 50 may be mounted to abut a right side A-pillar 20 of a vehicle. Alternatively, the front surface 52 may be mounted to abut a left side A-pillar of a vehicle. The same tether retainer 14 may be used on either A-pillar 20. The offset mounting holes 46 also align properly for either side. Thus, fewer different parts need to be fabricated and a worker may not as easily attach a retainer 14 to the wrong A-pillar 20.

Referring now generally to FIG. 2 and specifically to FIG. 3, the assembly process for the tether retainer 14 according to one embodiment will be described. Generally, a curtain airbag system 10 is assembled in a factory. The assembled system 10 is then provided to an original equipment manufacturer (OEM) to be installed in a new vehicle.

First, a worker is provided with a rolled curtain airbag 22 secured within a curtain airbag sleeve 24. The sail tether 12 is also in a roll. The worker may orient the tether retainer 14, as seen in FIG. 3, using guide nubs which correspond to the mounting holes 46.

Next, the sail tether roll may be centered along the length of the body 30. The worker then takes each tab 32 in succession and threads the tab 32 through the slot 36. The barbs 40 may be pinched together to facilitate passage through the slot 36. The worker may grab a tab lock 34 in one hand and a tab 32 in the other to aid in engaging the catch 38 with the tab lock 34. Finally, the worker may tug on the tab 32 to retract the tab 32 and engage the catch 38 in the slot 36. In this manner, a worker experiences minimal stress on his or her fingers, and hands as compared to conventional extrusion retainers.

Referring now to FIG. 4A, an alternative embodiment of an airbag tether retainer 114 is illustrated. In the depicted embodiment, the retainer 114 comprises a single strap 116 having a head 118 and a tail 120. Preferably, the head 118 and tail 120 are substantially the same size and shape. Generally, the strap 116 is rectangular shaped.

The head 118 and tail 120 are designed to engage each other to encircle and retain a sail tether 12. Generally, the strap 116 is made from flexible material such as high density polyethylene (HDPE), paper, cardboard, polypropylene, or the like. Thus, the head 118 and tail 120 may be joined by tying a knot in the strap 116.

In the depicted embodiment, the head 118 includes a fastener 134 and the tail 120 includes a catch 138. The fastener 134 and catch 138 may be implemented in various ways similar to the embodiments of the tab locks 34 and catches 38 described in relation to FIGS. 2 and 3. Accordingly, the fasteners 134 and catches 138 include similar features and characteristics to those described above. For example, the tail 120 may include a pair of barbs 140 and the fastener 134 may include a slot 136 sized to receive the tail 120 and retain the barbs 140. In certain embodiments, the head 118 may include a plurality of slots 136 such that one design of strap 116 may be used in different vehicles having different sized sail tethers 12.

Furthermore, the fastener 134 and catch 138 may release the sail tether 12 when the curtain airbag 22 is deployed. Alternatively, the strap 116 may include a release member (not shown) which severs the strap 116 similar to the release member 44 described above.

Preferably, the strap 116 includes a mounting member 142 for affixing the strap 116 to the aluminum frame of an A-pillar 20. The mounting member 142 may comprise a christmas tree rivet 142 which passes through a hole in the strap 116. In certain embodiments, a plurality of straps 116 are used to secure the sail tether 12.

FIG. 4B illustrates an alternative fastener 134 which may be used with a strap 116. Alternatively, this type of fastener 134 may be used as a tab lock 34 in other embodiments. The fastener 134 includes a loop 146. The loop 146 may extend from the surface of the head 118. Preferably, the loop 146 extends perpendicular to the surface. Alternatively, the loop 146 may extend in a direction transverse to a plane defined by the surface of the head 118. As described above, the loop 146 may engage a catch 138 disposed in the tail 120.

In summary, referring now generally to FIGS. 1-4B, an inexpensive, two-dimensional, flexible, and effective tether retainer 14 is provided. A two-dimensional flexible tether retainer 14 generally occupies less space than conventional tether retainers. Thus, vehicle manufacturers are better able to meet government safety regulations. The tether retainer 14 may include a body 30 which simplifies assembly of a curtain airbag 22 prior to delivery to an OEM. Alternatively, the tether retainer 14 may include a plurality of straps 116 having two ends which are fastenable to each other. Preferably, a flexible tether retainer 14 conforms to various contours of vehicle pillars, particularly, the A-pillar. Furthermore, the tether retainer 14 may be used for either the left or right side pillars of a vehicle which generally reduces production costs for the tether retainers 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. An airbag tether retainer comprising:
   a generally planar body;
   a tab that extends generally perpendicularly from one side of the body;
   a tab lock that engages the tab to secure an airbag tether between the tab and the body, wherein the tab lock extends generally perpendicularly from an opposite side of the body; and
   a release member that severs the tab when the airbag tether transmits tension to the tab engaged in the tab lock.

2. The airbag tether retainer of claim 1, wherein the tab comprises a catch and the tab lock comprises a slot sized to receive the tab and engage the catch when the catch is passed through the slot.

3. An airbag tether retainer of claim 2, wherein the catch comprises a pair of barbs extending from the tab in opposite directions, the barbs being shaped to allow the tab to readily pass through the slot in one direction and oppose passage of the tab through the slot in an opposite direction.

4. The airbag tether retainer of claim 1, wherein the tab lock is capable of releasing the tab when the airbag tether transmits tension to the tab engaged in the tab lock.

5. An airbag tether retainer of claim 1, wherein the tab lock comprises tape.

6. The airbag tether retainer of claim 1, wherein the body includes at least one mounting hole that allows the body to be mounted to a vehicle roof pillar.

7. The airbag tether retainer of claim 1, wherein the body conforms to the contour of a vehicle roof pillar.

8. An airbag tether retainer system comprising:
   an airbag tether connected to a curtain airbag;
   a generally planar body extending substantially parallel to the tether;
   a plurality of tab locks that extend from the body; and
   a plurality of tabs that extend from the body, the tabs being engaged by the tab locks to secure the tether to the body, the tabs being positioned opposite the tab locks.

9. The airbag tether retainer system of claim 8, wherein each tab lock is capable of releasing a tab when the airbag tether transmits tension to the tab engaged in the tab lock.

10. The airbag tether retainer system of claim 8, wherein each tab comprises a release member that severs the tab when the airbag tether transmits tension to the tab engaged in the tab lock.

11. The airbag tether retainer system of claim 8, wherein the airbag tether and body include corresponding mounting holes that allow the body and airbag tether to be mounted to a vehicle pillar.

12. The airbag tether retainer system of claim 8, wherein the airbag tether is a sail tether.

13. The airbag tether retainer system of claim 8, wherein the body conforms to the contour of a vehicle roof pillar.

14. The airbag tether retainer system of claim 8, wherein the body, tabs, and tab locks are formed from a single piece of flexible material.

15. An airbag tether retainer comprising:

an elongated generally planar body;

a plurality of tabs extending perpendicularly from one side of the body, each tab having a catch;

a plurality of tab locks extending perpendicularly from an opposite side of the body, each tab lock being capable of engaging the catch of a tab; and a plurality of release members that sever the plurality of tabs when the airbag tether transmits tension to tabs engaged in the tab locks, each release member being positioned between a tab lock and a corresponding catch.

16. The airbag tether retainer of claim 15, wherein each tab lock comprises a slot sized to receive a tab and each catch is sized and shaped to pass through the slot in one direction and oppose removal of the tab in an opposite direction.

17. The airbag tether retainer of claim 16, wherein each catch comprises a pair of barbs extending from a tab in opposite directions.

18. The airbag tether retainer of claim 17, wherein the body includes at least one mounting hole that allows the body to be mounted to a vehicle roof pillar.

19. The airbag tether retainer of claim 18, wherein the body conforms to the contour of a vehicle roof pillar.

20. The airbag tether retainer of claim 15, wherein the release member is a perforation.

21. The airbag tether retainer of claim 20, wherein the body, tabs, and tab locks are formed from a single piece of flexible material.

22. An airbag tether retainer comprising:

a strap having a head and a tail;

wherein the head and tail are capable of securely engaging each other to encircle and retain an airbag tether, the strap comprising a release member that readily severs the strap when the airbag tether transmits tension to the strap encircling and retaining the airbag tether, the release member being strategically positioned between the head and the tail.

23. An airbag tether retainer of claim 22, wherein the strap includes a mounting member for affixing the strap to a vehicle roof pillar.

24. The airbag tether retainer of claim 22, wherein the strap comprises a fastener disposed in the head and a catch disposed in the tail.

25. An airbag tether retainer of claim 24, wherein the fastener comprises a slot and the catch comprises a pair of barbs extending from the tail in opposite directions, the barbs being shaped to allow the tail to readily pass through the slot in one direction and oppose passage of the tail through the slot in an opposite direction.

26. The airbag tether retainer of claim 22, further comprising a plurality of straps.

27. The airbag tether retainer of claim 22, wherein the head and tail may be joined by tying.

28. The airbag tether retainer of claim 22, wherein the head and the tail are substantially the same size and shape.

* * * * *